United States Patent [19]

Gillon, Jr.

[11] Patent Number: 4,707,983
[45] Date of Patent: Nov. 24, 1987

[54] FLEXURE DISC SEALED INTEGRAL BIPROPELLANT VALVE AND INJECTOR VALVE ASSEMBLY

[75] Inventor: Willard A. Gillon, Jr., Canoga Park, Calif.

[73] Assignee: Rockwell International Corporation, El Segundo, Calif.

[21] Appl. No.: 934,364

[22] Filed: Nov. 24, 1986

[51] Int. Cl.$^4$ .......................... F02K 9/00; F02K 9/42; F02K 9/72

[52] U.S. Cl. ..................................... 60/258; 137/595; 137/625.4; 239/412

[58] Field of Search ................. 60/258, 259, 247, 248, 60/249, 39.79, 39.48, 741, 742; 137/595, 625.4, 625.5, 625.18, 597; 239/412, 95, 408–411

[56] References Cited

U.S. PATENT DOCUMENTS

| | | | |
|---|---|---|---|
| 2,810,259 | 10/1957 | Burdett, Jr. | 137/625.4 |
| 3,074,231 | 1/1963 | Klein | 60/258 |
| 3,215,352 | 11/1965 | Meraz, Jr. | 239/412 |
| 3,234,731 | 2/1966 | Dermody et al. | 60/741 |
| 3,464,633 | 9/1969 | Potocnik | 60/258 |
| 3,479,818 | 11/1969 | Strobl | 60/39.48 |
| 3,515,353 | 6/1970 | Young et al. | 60/258 |
| 3,897,008 | 7/1975 | Dettling et al. | 60/258 |
| 4,223,698 | 9/1980 | Reinicke | 137/595 |
| 4,258,546 | 3/1981 | Stratton | 60/259 |
| 4,326,377 | 4/1982 | Jaqua | 60/258 |
| 4,497,443 | 2/1985 | Sauer | 239/533.3 |

Primary Examiner—Carlton R. Croyle
Assistant Examiner—Donald E. Stout
Attorney, Agent, or Firm—H. Fredrick Hamann; Harry B. Field; David C. Faulkner

[57] ABSTRACT

A valve assembly (10) is provided in which a piston assembly (36) functions to control the introduction and expulsion of a fluid from external and internal manifolds (28,30) defined by the valve assembly housing (12) and the piston assembly. Extensions (42,44,46) provided with flexible disc seals (48) depend from a crown portion (40) of the piston assembly. The seals interface with a T-shaped annular partition (62) having a raised lip (68) in the base (66). The raised lip interfaces with the seals to close off fluid exit ports (80) in the base of the valve assembly housing. When functioned, the housing assembly and piston cause separation of the lip and disc allowing the flow of fluid through the valve assembly.

18 Claims, 3 Drawing Figures

FLEXURE DISC SEALED INTEGRAL BIPROPELLANT VALVE AND INJECTOR VALVE ASSEMBLY

BACKGROUND OF THE IVENTION

1. Field of the Invention

This invention relates to a valve assembly for controlling fluid flow.

The invention is also directed to a valve assembly for use with earth storable or cryogenic propellants. More particularly, the present invention is directed to a valve assembly for controlling the injection of propellants such as fuel and oxidizer into a combustion chamber of a fluid fueled rocket engine.

2. Background Art

Various fluid injection assemblies, discussed below and incorporated herein by reference, are designed to controllably inject propellant(s) into the combustion chamber of a rocket engine.

In accordance with the invention described in H. Strobl (U.S. Pat. No. 3,479,818), the housing or head portion 7 of a rocket engine is provided with a plurality of propellant pumps 10 and 11, which are of a sliding piston type.

Sauer (U.S. Pat. No. 4,497,443) describes an injection valve for fuel injection systems in internal combustion engines. The fuel injection valve 1 has a movable valve element 35, which cooperates with a correspondingly spherically shaped valve seat 36 in a nozzle body 37. When the electromagnet of the fuel injection valve is excited, the movable valve element 35 is lifted from the valve seat so that fuel may flow between the movable valve element 35 and the valve seat 36 and into a collecting chamber 38.

BRIEF SUMMARY AND OBJECTS OF THE INVENTION

The valve assembly of the present invention is designed to ensure reliable and optimal performance when it is desirable to control the flow of one or more fluids prior to mixing and/or utilization thereof.

The valve assembly of the present invention includes a valve assembly housing defining a core having a piston assembly retained therein. Within the piston assembly are external and internal manifolds including fluid inlets and passageways communicating with the piston assembly for allowing the flow of a fluid into the piston manifolds.

In association with the valve assembly housing and piston assembly, means for activating the piston assembly include first and second actuator fluid ports and first and second annulus formed in the valve assembly housing and in communicative relationship with the actuator fluid ports.

Fluid inlets communicate with first and second fluid inlet chambers defined by the housing and piston assemblies. Pressurized fluid entering into the valve assembly from the inlets is retained in the external or internal manifolds by flexible disc seals associated with the piston assembly. Upon actuation, the piston assembly elements may be either slidably extended or retracted so as to allow or preclude the flow of fluids from the external and internal manifolds without the valve assembly by means of fluid ports communicating from the external and internal manifolds through the housing base and an opening in the exterior surface thereof.

Accordingly, it is an object of this invention to provide a valve assembly for controllably mixing or dispensing fluids.

Another object of this invention is to provide a valve assembly for controlling a fluid flow into a combustion chamber of a fluid-fueled rocket engine.

Yet another object of this invention is to provide a valve assembly which minimizes the fluid volume trapped between the valve sealing means and a combustion chamber.

Still another object of this invention is to provide a valve assembly in which the utilization of flexible metallic seals prevents seat leakage due to high temperatures at the seat closure resulting from heat soak-back.

These and other objects and features of the present invention will be apparent from the following detailed description taken with reference to the accompanying drawings.

DETAILED DESCRIPTION OF THE INVENTION

Figure 1:
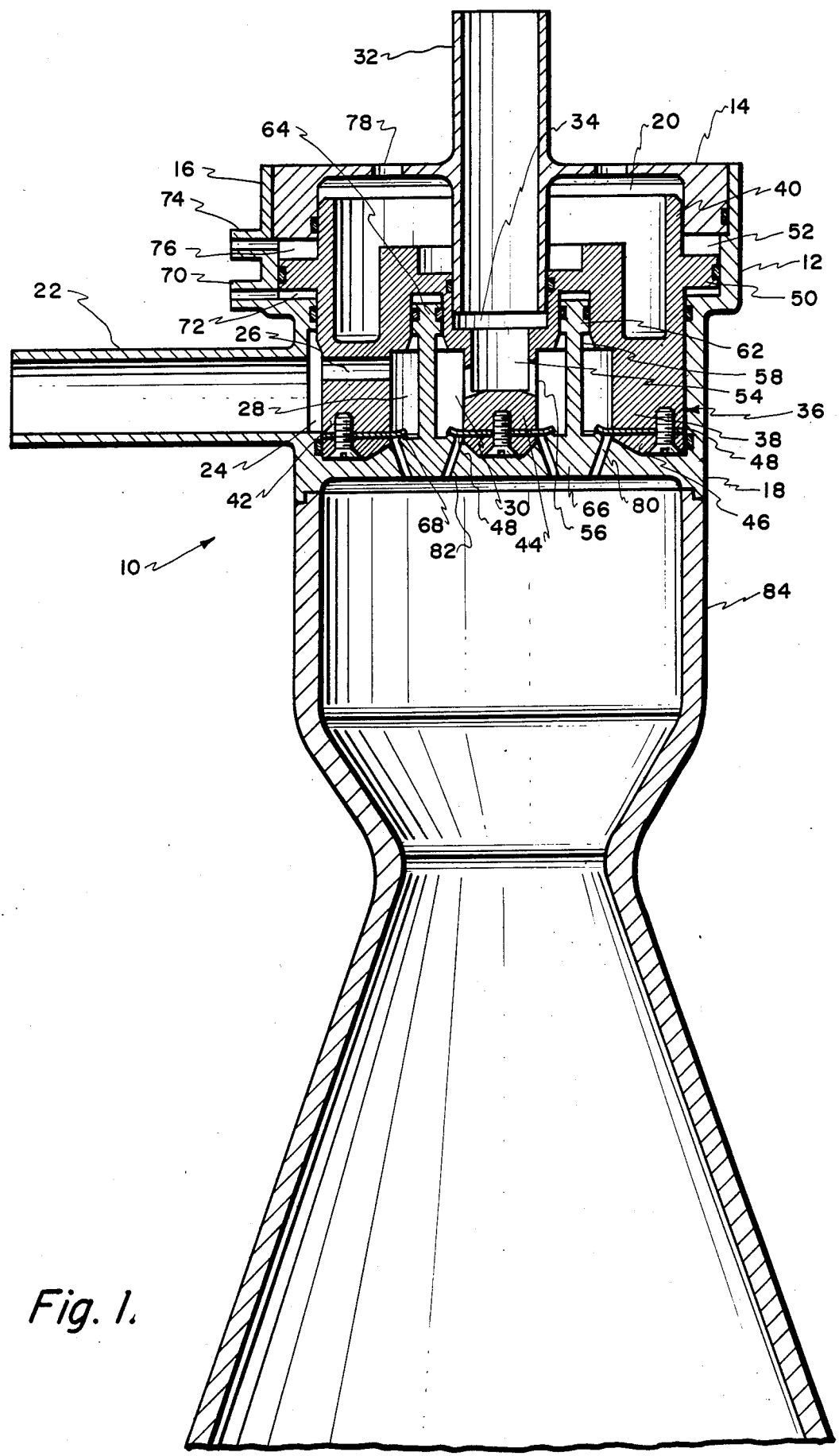
FIG. 1 shows a cross-sectional view of a valve assembly having a piston assembly and related components as well as a means for activating the piston assembly according to the invention for controlling fluid flow.

In FIG. 1 there is shown a valve assembly for controlling the flow of pressurized fluids from a remote source (not shown) for the intimate mixing or interaction thereof. This mixing and/or interaction may find application, for example, in fluid sprinkling, spraying or diffusing apparatus but the preferred embodiment as described in greater detail below is a valve assembly for controllably injecting propellants into a combustion chamber of a fluid-fueled rocket engine.

Referring to the drawings in detail, 10 indicates the valve assembly according to the present invention. Valve assembly 10 comprises a housing 12 including a top 14, side 16 and base 18, each having wall surfaces. The valve assembly housing defines a core 20 including a piston assembly retained within the housing core. The piston assembly and base portion of the valve assembly housing further define external and internal manifolds as discussed in greater detail below.

A first fluid inlet 22, chamber 24 and a fluid inlet passageway 26 are formed by the housing and piston assembly. Passageway 26 communicates between fluid inlet chamber 24 and external manifold 28. A second fluid inlet 32 located medially of the valve assembly communicates with a second fluid inlet chamber 34 in the piston assembly.

The piston assembly 36 defines an annular trident-shaped structure 38 including a hollow crown 40 and three extensions 42, 44, 46 depending therefrom. Each of these extensions is provided with flexible metal disc seals 48 fixedly attached thereto such as by screws or the like. An annular flange 50 integral to the crown structure 40 extends outwardly in a horizontal plane from the crown 40 and into a cavity 52 defined by the valve assembly housing 12 and the piston assembly 36.

In central extension 44 of the crown 40, there is a fluid receptacle 54 communicating with fluid chamber 34. Fluid receptacle 54 is provided with channel 56 communicating with internal manifold 30.. At the juncture of the inlet chamber 34 and fluid receptacle 54 there is an annular recess 58 in the root of the crown. Within annular recess 58 is T-shaped annular partition 62 having a top 64 and a bottom 66 section, the latter forming part of the valve assembly housing base. The top section 64 of the T-shaped annular partition 62 is slidably retained within annular recess 58. The bottom section 66 depending from the annular recess includes a raised annular lip 68 in which the conjunction with the flexure disc 48 forms a tentative fluid closure between the internal and external manifolds and the fluid exit ports 80. This T-shaped annular partition in cooperation with the piston assembly housing forms a division between the external and internal manifolds.

Referring again to FIG. 1, a first actuator fluid port 70 is formed in the valve assembly housing wall and communicates with a first annulus 72. A second actuator fluid port 74 is also provided in the valve assembly housing and in turn communicates with a second annulus 76. The first and second annulus are formed by flange 50 extending from the crown 40 of the piston assembly 36. A pressurized actuating fluid, which may be either liquid or gas, can be selectively charged through either the first or second fluid ports and into the corresponding annulus. When operating at or near atmospheric pressure, a vent 78 provided in the valve assembly housing top communicates with the core of the assembly and the atmosphere. This allows a pressure equalization to occur which facilitates functioning of the valve assembly.

In the piston assembly of FIG. 1, the bottom 66 of the T-shaped annular partition 62 is formed integrally with the base 18 of the valve assembly housing 12. The upper or top section 64 of the T-shaped annular partition 62 is slidably retained within recess 88. Fluid ports 80 communicating from the external and internal manifolds pass through the housing base and open into and through the exterior surface 82 of the housing base at an inner surface of a combustion chamber 84.

Figure 2:
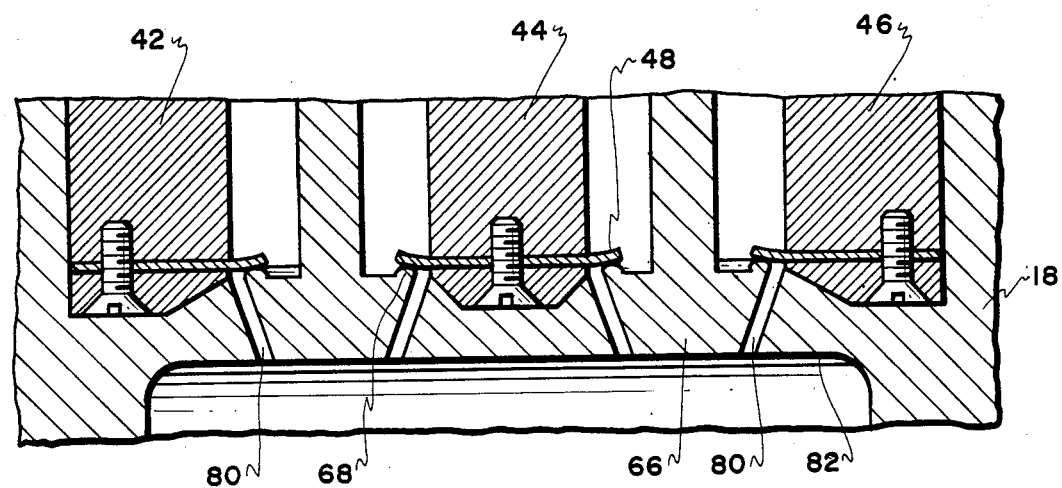
FIGS. 2 and 3 illustrate a preferred embodiment of the present invention detailing a piston assembly and its function.
Figure 3:
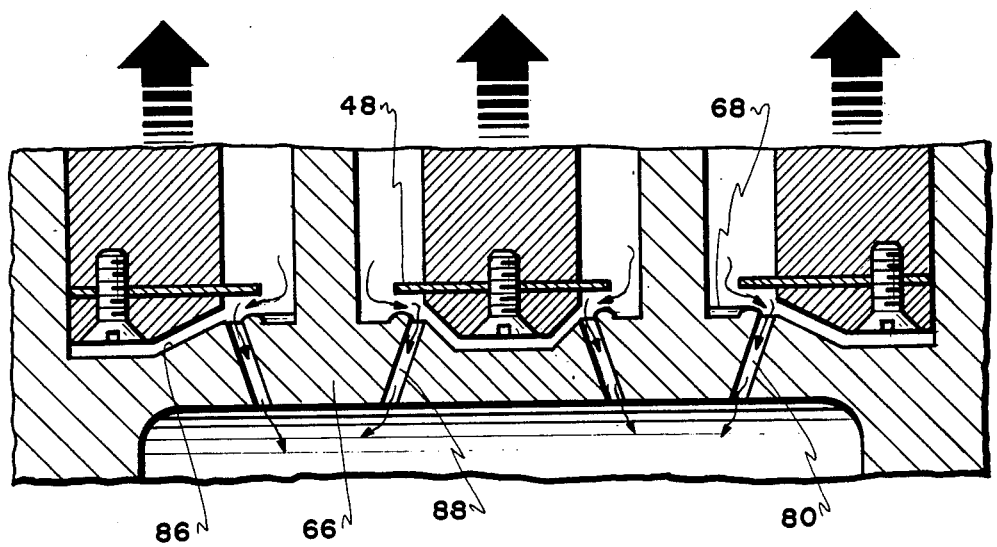

In operation, fluid under pressure, such as cryogens, is fed to the first fluid inlet 22 which communicates with the first fluid inlet chamber 24, passageway 26 and external manifold 28. A second fluid under pressure, which may also be a cryogen, is introduced into second fluid inlet 32 which in turn communicates with the second fluid inlet chamber 34, receptacle 56 and internal manifold 30. As shown in FIGS. 1 and 2, the valve assembly is in a closed mode, i.e. each of the extensions from the piston crown 40 are seated in a triangular shaped or angled recess 86 formed within the base of the valve assembly housing. The flexible seals 48 overlap the raised lip 68 of the base 66 of the T-shaped annular partition 62 which precludes the flow of fluid from either the external or internal manifolds to pass through ports 80 and into the combustion chamber 84.

When an actuating fluid such as nitrogen is introduced into the first actuator fluid port 70, this pressurized gas enters first annulus 72 and causes the piston assembly 36 to move within the core 20 in a direction away from the rocket engine chamber 84. At this time, the extensions 42, 44, 46 depending from crown 40 are simultaneously withdrawn from the triangular shaped recess 86 in the housing base 18 and a fluid flow channel is established whereby the pressurized fluid entering through fluid inlets 22, 32 may be introduced into the combustion chamber.

When it is desired to curtail the flow of fluid into combustion chamber 84, an actuating fluid is introduced into the second actuator fluid port 74 and the second annulus 76, while simultaneously withdrawing actuating fluid out of the first annulus 72 through the first actuator fluid port 70 by a controller or control monitoring system (not shown). This will cause the piston assembly to move in a downward position or toward the combustion chamber, seating extensions 42, 44, 46 in recess 86. Simultaneously, flexible discs 48 overlap annular lip 68 thus sealing off the fluid outlet ports 80.

The fluids injected into combustion chamber 84 may be hypergolic and the resulting interaction therebetween converts the fluid or fuel components into high-pressure gases which are in turn converted into thrust for propelling or directing an atmospheric or space vehicle as desired.

It will of course be realized that various modifications can be made in the design and operation of the present invention without departing from the spirit thereof. Thus, while the principal, preferred construction, and mode of operation of the invention have been explained, it should be understood that within the scope of the appended claims the invention may be practiced otherwise than as specifically illustrated and described.

What is claimed and desired to be secured by Letters Patent of the United States is:

1. A valve assembly for controlling a fluid flow comprising:
    a valve assembly housing including a top, side and base, each having wall surfaces;
    a core formed by the valve assembly housing;
    a piston assembly;
    external and internal manifolds formed within the piston assembly;
    a first fluid inlet chamber;
    a fluid inlet passageway formed within the piston assembly and communicating between the fluid inlet chamber and the external manifold;
    a second fluid inlet chamber formed medially of the piston assembly;
    a fluid receptacle associated with the second fluid inlet;
    a fluid inlet channel communicating between the fluid receptacle and the internal manifold;
    means for introducing fluid into the valve assembly;
    means for actuating the piston assembly; and
    means for ejecting fluid from the valve assembly.

2. The valve assembly of claim 1 in which the piston assembly further comprises:
    an annular trident-shaped structure including a hollow crown;
    an annular flange extending outward in a horizontal plane from the crown;
    an annular recess within a center section of the piston assembly;
    extensions, including bottom sections, depending from the crown; and
    flexible disc seals fixedly attached to the extensions.

3. The valve assembly of claim 1 in which the assembly housing base includes:
    an inner T-shaped annular partition;
    an annular raised lip within the external and internal manifolds; and
    a spaced angled recess for receiving a bottom section of the T-shaped annular partition.

4. The valve assembly of claim 1 in which the means for introducing fluid into the valve assembly comprises a first fluid inlet communicating with the first fluid inlet chamber and a second fluid inlet communicating with the second fluid inlet chamber.

5. The valve assembly of claim 1 in which the piston assembly is slidably ratained within the housing core.

6. The valve assembly of claim 1 in which the means for ejecting fluid from the valve assembly comprises fluid ports communicating from the external and internal manifolds formed within the valve assembly and through the housing base and opening in an exterior surface of the housing base.

7. The valve assembly of claim 1 in which the means for activating the valve assembly comprises:
   a first actuator fluid port;
   a first annulus in communicative relationship with the first actuator fluid port;
   a second actuator fluid port;
   a second annulus in communicative relationship with the second actuator fluid port; and
   means for selectively introducing and withdrawing an acutator fluid into the first and second fluid ports and the first and second annuli.

8. The valve assembly of claim 1 in which the valve assembly housing top is provided with at least one vent in communication with the core and atmosphere.

9. The valve assembly of claim 2 in which the piston assembly further comprises:
   a T-shaped annular partition having a top and bottom section, the top section fixedly retained within the annular recess, the bottom section having a surface including a raised lip;
   extensions depending from the crown; and
   flexible disc seals fixedly attached to the extensions.

10. A valve assembly for controllably injecting propellants into a combustion chamber of a fluid-fueled rocket engine, comprising:
    a valve assembly housing structure including means for sealably interfacing the valve assembly and a rocket engine combustion chamber;
    a core formed by the valve assembly housing;
    a piston assembly;
    external and internal manifolds formed within the piston assembly;
    a first fluid inlet chamber;
    a fluid inlet passageway formed within the piston assembly and communicating between the fluid inlet chamber and the external manifolds;
    a second fluid inlet chamber formed medially of the piston assembly;
    a fluid receptacle associated with the second fluid inlet;
    a fluid inlet channel communicating between the fluid receptacle and the internal manifold;
    means for introducing fluid into the valve assembly;
    means for actuating the piston assembly; and
    means for ejecting fluid from the valve assembly.

11. The valve assembly of claim 10 in which the piston assembly further comprises:
    an annular trident-shaped structure including a hollow crown;
    an annular flange extending outward in a horizontal plane from the crown;
    an annular recess within a center section of the piston assembly;
    extensions, including bottom sections, depending from the crown; and
    flexible disc seals fixedly attached to the extensions.

12. The valve assembly of claim 10 in which the assembly housing base includes:
    an inner T-shaped annular partition;
    an annular raised lip within the external and internal manifolds; and
    a spaced angled recess for receiving a bottom section of the T-shaped annular partition.

13. The valve assembly of claim 10 in which the means for introducing fluid into the valve assembly comprises a first fluid inlet port communicating with the first fluid inlet chamber and a second fluid inlet communicating with the second fluid inlet chamber.

14. The valve assembly of claim 10 in which the piston assembly is slidably retained within the housing core.

15. The valve assembly of claim 10 in which the means for ejecting fluid from the valve assembly comprises fluid ports communicating from the external and internal manifolds formed within the piston assembly and through the housing base and opening in an exterior surface of the housing base.

16. The valve assembly of claim 10 in which the means for activating the valve assembly comprises:
    a first actuator fluid port;
    a first annulus in communicative relationship with the first actuator fluid port;
    a second actuator fluid port;
    a second annulus in communicative relationship with the second actuator fluid port; and
    means for selectively introducing and withdrawing an actuator fluid into the first and second fluid ports and the first and second annuli.

17. The valve assembly of claim 10 in which the valve assembly housing top is provided with at least one vent port in communication with the core and atmosphere.

18. The valve assembly of claim 11 in which the piston assembly further comprise:
    a T-shaped annular partition having a top and bottom section, the top section fixedly retained within the annular recess, the bottom section having a surface including a raised lip;
    extensions depending from the crown; and
    flexible disc seals fixedly attached to the extensions.

* * * * *